United States Patent
Wang

(10) Patent No.: US 11,431,782 B2
(45) Date of Patent: Aug. 30, 2022

(54) METHOD, APPARATUS, AND DEVICE FOR TRANSMITTING FILE BASED ON BMC, AND MEDIUM

(71) Applicant: ZHENGZHOU YUNHAI INFORMATION TECHNOLOGY CO., LTD., Henan (CN)

(72) Inventor: Xuelong Wang, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 598 days.

(21) Appl. No.: 16/475,106

(22) PCT Filed: Oct. 26, 2018

(86) PCT No.: PCT/CN2018/112000
§ 371 (c)(1),
(2) Date: Jun. 30, 2019

(87) PCT Pub. No.: WO2019/227836
PCT Pub. Date: Dec. 5, 2019

(65) Prior Publication Data
US 2021/0337011 A1   Oct. 28, 2021

(30) Foreign Application Priority Data

May 31, 2018   (CN) .......................... 201810550860.0

(51) Int. Cl.
*G06F 15/16*   (2006.01)
*H04L 67/06*   (2022.01)
(Continued)

(52) U.S. Cl.
CPC .............. *H04L 67/06* (2013.01); *G06F 13/42* (2013.01); *H04L 67/02* (2013.01); *H04L 67/1095* (2013.01); *H04L 67/1097* (2013.01)

(58) Field of Classification Search
CPC ......... G06F 13/42; H04L 67/02; H04L 67/06; H04L 67/1095; H04L 67/1097; H04L 67/2876
(Continued)

(56) References Cited

U.S. PATENT DOCUMENTS

| 9,118,584 B2 * | 8/2015 | Ayanam | .................. G06F 11/30 |
| 2012/0297098 A1 * | 11/2012 | Li | .......................... H04L 67/38 |
| | | | 710/72 |

(Continued)

FOREIGN PATENT DOCUMENTS

| CN | 102204184 A | 9/2011 |
| CN | 103955441 A | 7/2014 |

(Continued)

OTHER PUBLICATIONS

International Search Report for PCT/CN2018/112000 dated Mar. 7, 2019, ISA/CN.
(Continued)

*Primary Examiner* — Liang Che A Wang
(74) *Attorney, Agent, or Firm* — Yue Robert Xu; Apex Attorneys at Law, LLP

(57) ABSTRACT

A method, an apparatus, and a device for transmitting a file based on a BMC, and a medium are provided. The method includes: receiving, by a second BMC, a preset command sent by a first BMC, where the preset command indicates that transmission of a file is to be initiated; parsing the preset command, and stopping an IPMI process running based on a UART interface in response to the preset command; and receiving, by using a communication function of the UART interface, a data file transmitted by the first BMC. With the method, when the data file is transmitted between the BMCs, the data file is not intercepted and verified by the preset command processing function of the IPMI process running (Continued)

based on the UART interface, and the IPMI process is prevented from being blocked and crashing, thereby implementing transmission of data files between BMCs.

13 Claims, 2 Drawing Sheets

(51) Int. Cl.
*G06F 13/42* (2006.01)
*H04L 67/02* (2022.01)
*H04L 67/1095* (2022.01)
*H04L 67/1097* (2022.01)

(58) Field of Classification Search
USPC .......................................... 709/217, 218, 219
See application file for complete search history.

(56) References Cited

U.S. PATENT DOCUMENTS

| | | | | |
|---|---|---|---|---|
| 2013/0117766 A1* | 5/2013 | Bax | .................. | G06F 9/4405 719/323 |
| 2016/0118121 A1* | 4/2016 | Kelly | .................. | G06F 13/4282 710/301 |
| 2017/0139797 A1* | 5/2017 | Wang | .................. | G06F 13/364 |
| 2018/0226051 A1* | 8/2018 | Swaminathan | ........... | G06T 1/20 |
| 2018/0336324 A1* | 11/2018 | Kodama | ............... | H04L 63/083 |

FOREIGN PATENT DOCUMENTS

| CN | 106844162 A | 6/2017 |
|---|---|---|
| CN | 107133186 A | 9/2017 |
| CN | 107193594 A | 9/2017 |
| CN | 107526616 A | 12/2017 |
| CN | 107943623 A | 4/2018 |
| CN | 108021518 A | 5/2018 |

OTHER PUBLICATIONS

The 1st Office Action regarding Chinese Patent Application No. CN201810550860.0, dated Nov. 3, 2020. English Translation Provided by http://globaldossier.uspto.gov.
Uranus Zhou, kipmiO Process CPU Occupancy Problem, Wiki, https://wiki.zohead.com, Feb. 9, 2017.

* cited by examiner

METHOD, APPARATUS, AND DEVICE FOR TRANSMITTING FILE BASED ON BMC, AND MEDIUM

This application is the national phase of International Application No. PCT/CN2018/112000, titled "METHOD, APPARATUS, AND DEVICE FOR TRANSMITTING FILE BASED ON BMC, AND MEDIUM", filed on Oct. 26, 2018, which claims the priority to Chinese Patent Application No. 201810550860.0, titled "METHOD, APPARATUS, AND DEVICE FOR TRANSMITTING FILE BASED ON BMC, AND MEDIUM", filed on May 31, 2018 with the China National Intellectual Property Administration, which are incorporated herein by reference in their entireties.

FIELD

The present disclosure relates to the field of file transmission, and in particular to a method, an apparatus, and a device for transmitting a file based on a BMC, and a medium.

BACKGROUND

A BMC is a baseboard management system located on a server, and is responsible for important functions of the server including asset information display, hardware monitoring, heat dissipation regulation, system configuration, remote monitoring, log collection, fault diagnosis, and system maintenance.

In general application scenarios in the field, two or more BMCs are required to perform monitoring and management on a server. In the above scenario, multiple BMCs include a primary BMC that directly interacts with a user, and a slave BMC that interacts with the primary BMC and assists in operation of the primary BMC, where the primary BMC responds to the user's control by providing a network interface and a web page. The BMCs are connected with each other through a UART interface. On this basis, both the primary BMC and the slave BMC run an IPMI process, and the primary BMC transmits a control command to the slave BMC based on an IPMI protocol, to control the slave BMC.

Due to growing demands of users, not only control commands, but also data files need to be transmitted between the BMCs. However, since there is already a set of command transmission mechanism for the UART interface in a BMC system, and under the command transmission mechanism, a data file transmitted between the BMCs is determined by the system to be a control command, and is intercepted and verified by a command processing function of the IPMI process. However, the data file does not have a given data format of the control command, which blocks the IPMI process and causes crash of the IPMI process, such that the data file can not be transmitted between BMCs.

It can be seen that it is an urgent problem to be solved by those skilled in the art to provide a method for transmitting a file based a BMC, to implement data file transmission between BMCs.

SUMMARY

It is an object of the present disclosure to provide a method, an apparatus, and a device for transmitting a file based a BMC, and a medium to implement data file transmission between BMCs.

In order to solve the above technical problem, a method for transmitting a file based on a BMC is provided according to the present disclosure, which includes:

receiving, by a second BMC, a preset command sent by a first BMC, where the preset command indicates that transmission of a file is to be initiated;

parsing the preset command, and stopping an IPMI process running based on a UART interface in response to the preset command; and receiving, by using a communication function of the UART interface, a data file transmitted by the first BMC.

Preferably, the parsing the preset command, and stopping the IPMI process running based on the UART interface in response to the preset command may include:

parsing the preset command, and modifying a value of a preset flag variable from an initial value to a flag value in response to the preset command, and monitoring the flag variable by using a preset process, and stopping the IPMI process running based on the UART interface by calling a system function when the value of the flag variable is the flag value.

Preferably, after the receiving, by using the communication function of the UART interface, the data file transmitted by the first BMC, the method may further include:

modifying the value of the flag variable to the initial value, and restarting the IPMI process in the second BMC by calling the system function.

Preferably, after the stopping the IPMI process running based on the UART interface by calling the system function, the method may further include:

recording, in a log file, a time instant at which the IPMI process is stopped and parameter information of the second BMC in correspondence with each other.

Preferably, the initial value may be 1, and the flag value may be 0.

Preferably, the data file may be a mirror file of a bin type.

A BMC apparatus is further provided according to the present disclosure, which includes: a command reception module, a command response module, and a data reception module.

The command reception module is configured to receive a preset command sent by a first BMC, where the preset command indicates that transmission of a file is to be initiated.

The command response module is configured to parse the preset command, and stop an IPMI process running based on a UART interface in response to the preset command.

The data reception module is configured to receive, by using a communication function of the UART interface, a data file transmitted by the first BMC.

Preferably, the command response module may further include a variable modification module and a monitoring calling module.

The variable modification module is configured to parse the preset command and modify a value of a preset flag variable from an initial value to a flag value in response to the preset command.

The monitoring calling module is configured to monitor the flag variable by using a preset process, and stop the IPMI process running based on the UART interface by calling a system function when the value of the flag variable is the flag value.

A device for transmitting a file based on a BMC is further provided according to the present disclosure. The device includes a memory and a processor.

The memory is configured to store a computer program.

The processor is configured to execute the computer program to implement steps of the above method for transmitting a file based on a BMC.

A computer readable storage medium is further provided according to the present disclosure. The computer readable storage medium stores a computer program, the computer program is executed by a processor to implement steps of the above method for transmitting a file based on a BMC.

With the method for transmitting a file based on a BMC according to the present disclosure, the second BMC receives the preset command sent by the first BMC, where the preset command indicates that transmission of a file is to be initiated, stops the IPMI process running based on the UART interface on the second BMC in response to the preset command, and receives, by using the communication function of the UART interface, the data file transmitted by the first BMC. According to the method, when the data file is transmitted between the BMCs, the IPMI process running on the BMC receiving the data file is stopped, such that the data file transmitted between the BMCs is not intercepted and verified by the preset command processing function of the IPMI process running based on the UART interface, and the IPMI process is prevented from being blocked and crashing, thereby implementing transmission of data files between BMCs. In addition, an apparatus and a device for transmitting a file based on a BMC, and a medium are provided according to the present disclosure, which have the same beneficial effects as described above.

BRIEF DESCRIPTION OF THE DRAWINGS

The drawings to be used in the description of the embodiments are described briefly as follows, so that the technical solutions according to the embodiments of the present disclosure become clearer. It is apparent that the drawings in the following description only illustrate some embodiments of the present disclosure. For those skilled in the art, other drawings may be obtained according to these drawings without any creative work.

DETAILED DESCRIPTION OF THE EMBODIMENTS

The technical solutions according to the embodiments of the present disclosure are described clearly and completely in conjunction with the drawings hereinafter. It is apparent that the described embodiments are only a few rather than all of the embodiments according to the present disclosure. Any other embodiments obtained by those skilled in the art based on the embodiments in the present disclosure without any creative work fall into the scope of the present disclosure.

The core of the present disclosure is to provide a method for transmitting a file based on a BMC to implement data file transmission between BMCs. Another core of the present disclosure is to provide an apparatus, a device for transmitting a file based on a BMC, and a medium.

For those skilled in the art better understanding the technical solutions of the present disclosure, hereinafter the present disclosure will be further described in detail in conjunction with the drawings and embodiments.

First Embodiment

Figure 1:
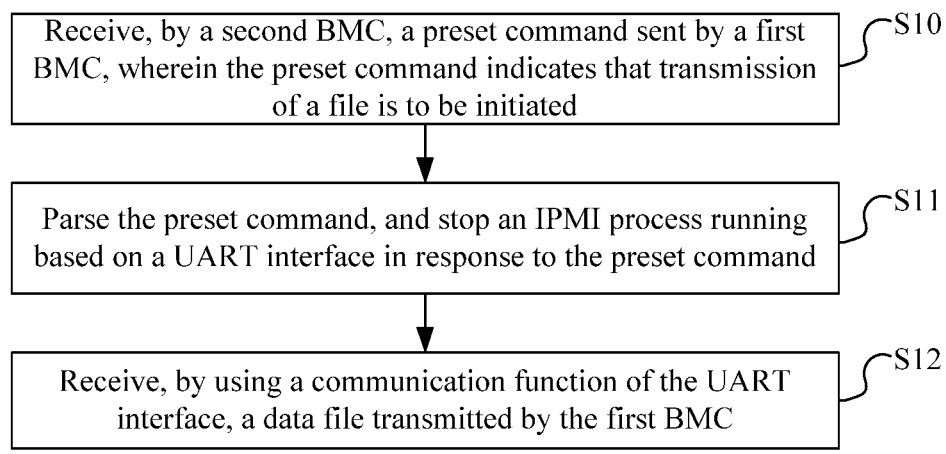
FIG. 1 is a flowchart of a method for transmitting a file based on a BMC according to an embodiment of the present disclosure.

FIG. 1 is a flowchart of a method for transmitting a file based on a BMC according to an embodiment of the present disclosure. Referring to FIG. 1, the method for transmitting a file based on a BMC includes the following steps S10 to S13.

In Step S10, a second BMC receives a preset command sent by a first BMC, where the preset command indicates that transmission of a file is to be initiated.

It is to be noted that the BMC (Baseboard Management Controller) mentioned in this step is a small operating system independent of a server system, and is generally integrated on a server motherboard or is inserted in various forms such as PCIE into a chip of the server motherboard. The BMC follows the IPMI specification, which is an industrial standard and describes management functions (including local or remote diagnostics, console support, configuration management, hardware management, and troubleshooting) that are built into the motherboard. The first BMC in this step represents a BMC that initiates data file transmission, and the second BMC represents a BMC that receives the data file transmitted by the first BMC, so the "first BMC" and "second BMC" are irrelevant to a performance of the BMC itself, but depend on the operation performed by the BMC in specific scenarios. In this step, the preset command is a control command following the IPMI specification. After the preset command is sent to the second BMC by the first BMC, the second BMC can analyze and responds to the control command based on the IPMI specification by using a command processing function.

In Step S11, the preset command is parsed, and an IPMI process running based on a UART interface is stopped in response to the preset command.

UART (Universal Asynchronous Receiver/Transmitter) is used for asynchronous communication, and is configured to perform communicate in both directions and can realize full-duplex transmission and reception. In an embedded design, the UART interface is used for communication between a host and an auxiliary device.

It is to be noted that, the IPMI process is a logical process established based on a connection implemented with hardware. In the present disclosure, the BMC is carried by a chip, and chips are connected through the UART interface. Therefore, a communication between the first BMC and the second BMC based on the IPMI process is established based on the UART interface. It should be understood that, after the second BMC stops the IPMI process, the communication based on the IPMI process between the first BMC and the second BMC is cut off, so the a data file transmitted by the first BMC to the second BMC is not determined as the control command, and is not intercepted and verified by the IPMI process in the second BMC.

In Step S12, a data file transmitted by the first BMC is received by using a communication function of the UART interface.

In the method, data transmission association is established between the first BMC and the second BMC based on the UART interface, and the UART interface has a preset communication function for implementing data transmission between hardware devices connected by using the UART interface. Therefore, in this step, the data file is directly transmitted to the second BMC by using the communication function of the UART interface, to implement data transmission. The focus of this step is to avoid transmission of the data file by using the transmission mechanism provided by the IPMI process, and how to transmit the data file by using the communication function of the UART interface and the content of the communication function are not key points and are well known to those skilled in the art, and thus are not described herein.

It is to be noted that, the data file is essentially distinguished from the control command mentioned in the present disclosure in that the data format of the data file is different from the given data format of the control command, and is difficult to be converted into the given data format of the control command.

With the method for transmitting a file based on a BMC according to the present disclosure, the second BMC receives the preset command sent by the first BMC, where the preset command indicates that transmission of a file is to be initiated, stops the IPMI process running based on the UART interface on the second BMC in response to the preset command, and receives, by using the communication function of the UART interface, the data file transmitted by the first BMC. According to the method, when the data file is transmitted between the BMCs, the IPMI process running on the BMC receiving the data file is stopped, such that the data file transmitted between the BMCs is not intercepted and verified by the preset command processing function of the IPMI process running based on the UART interface, and the IPMI process is prevented from being blocked and crashing, thereby implementing transmission of data files between BMCs.

Second Embodiment

Based on the above embodiments, a number of preferred embodiments are also provided in the present disclosure as follows.

Figure 2:
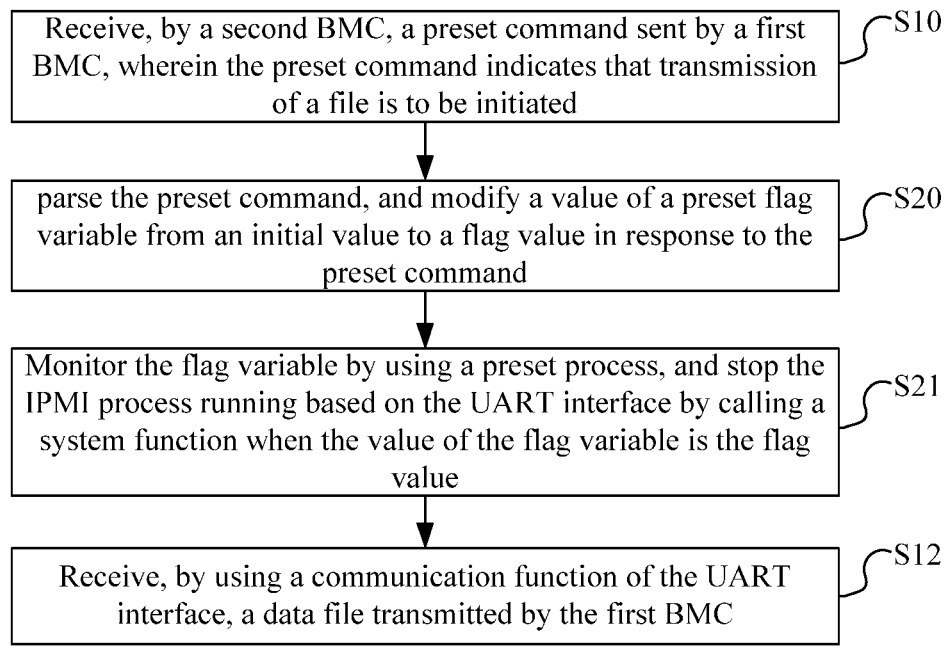
FIG. 2 is a flowchart of a method for transmitting a file based on a BMC according to another embodiment of the present disclosure.

FIG. 2 is a flowchart of a method for transmitting a file based on a BMC according to another embodiment of the present disclosure, where step S10 and step S12 are the same as those in FIG. 1 and will not be described again.

As shown in FIG. 2, as a preferred embodiment, step S11 includes the following steps S20 and S21.

In step S20, the preset command is parsed, and a value of a preset flag variable is modified from an initial value to a flag value is response to the preset command.

In Step S21, the flag variable is monitored by using a preset process, and the IPMI process running based on the UART interface is stopped by calling a system function when the value of the flag variable is the flag value.

It is to be noted that, since in the present disclosure both the control command and the data file are transmitted between the BMCs, the flag variable in this embodiment is used to indicate the content currently transmitted between the BMCs. In a case that the value of the flag variable is the flag value, it is indicated that the data file is to be transmitted between the BMCs currently. Therefore, the value of the preset flag variable is modified from the initial value to the flag value is response to the preset command for indicating data file transmission. The flag variable is monitored by using the preset process, and when the value of the flag variable is the flag value, an operation corresponding to a case that the value of the flag variable is the flag value is performed, that is, the IPMI process running based on the UART interface is stopped by calling the system function. By using the flag variable, the preset process is accurately instructed to perform a corresponding operation. Since the flag variable has a wide value range, the value of the flag variable can be configured corresponding to operations in various cases, thus improving the expansibility.

On the basis of the above embodiments, as a preferred embodiment, after the receiving, by using the communication function of the UART interface, the data file transmitted by the first BMC, the method further includes:

modifying the value of the flag variable to the initial value and restarting the IPMI process in the second BMC by calling the system function.

It should be understood that, in this step, when the value of the flag variable is the initial value, it is indicated that a control command is to be transmitted between the BMCs.

Considering that the control command is transmitted between the BMCs in most cases of communication, and in order that the transmission of the control command is not affected due to the stopped IPMI process when the transmission of the data file between the BMCs is finished, in this embodiment, after the data file is transmitted to the second BMC, the value of the flag variable is modified to the initial value, and the IPMI process is restarted by calling the system function, such that the control command can be transmitted between the BMCs to ensure the overall communication availability between the BMCs.

On the basis of the above-mentioned embodiments, as a preferred embodiment, after the IPMI process running based on the UART interface is stopped by calling the system function, the method further includes:

recording, in a log file, a time instant at which the IPMI process is stopped and parameter information of the second BMC in correspondence with each other.

After the time instant at which the IPMI process is stopped and the parameter information of the second BMC are recorded in correspondence with each other in the log file, time instants at which data files are transmitted between the BMCs and the parameter information of the second BMC at each time instant can be acquired from the log file. It is to be noted that the parameter information of the second BMC characterizes a running state of the second BMC when the data file is transmitted, and if abnormality occurs during transmission of the data file between the BMCs, the cause of the abnormality can be analyzed based on the content of the log file, thereby improving the efficiency for handling the abnormality.

Based on the above-described embodiments, as a preferred embodiment, the initial value is 1, and the flag value is 0.

It should be understood that, the initial value being 1 and the flag value being 0 is applicable for the case where the control command and the data file are transmitted between the BMCs. In this embodiment, the setting of the initial value and the flag value is relatively simple, thus a setting error which leads to a reduced overall availability can be avoided.

In addition, as a preferred embodiment, the data file is a mirror file of a bin type.

During use of the BMC, the version of the BMC needs to be upgraded according to actual use requirements. Since the bin type file is a file of a type that can be read and parsed by the BMC, an update firmware of the BMC can be carried in the form of a mirror file of a bin type. The mirror file is transmitted as a data file between the BMCs, and the firmware version of the BMC is upgraded by using the mirror file. Therefore, the mirror file of the bin type can be manually loaded onto one BMC, and is transmitted from the BMC to another BMC, thereby upgrading all of the BMCs, which improves the efficiency of updating the firmware version of the BMCs.

Third Embodiment

The embodiments of the method for transmitting a file based on a BMC are described in detail above. A BMC apparatus corresponding to the method is further provided according to the present disclosure. Since the apparatus disclosed in the embodiments corresponds to the method disclosed in the embodiments, for relevant parts, reference may be made to the description of the method, which is not described here again.

Figure 3:
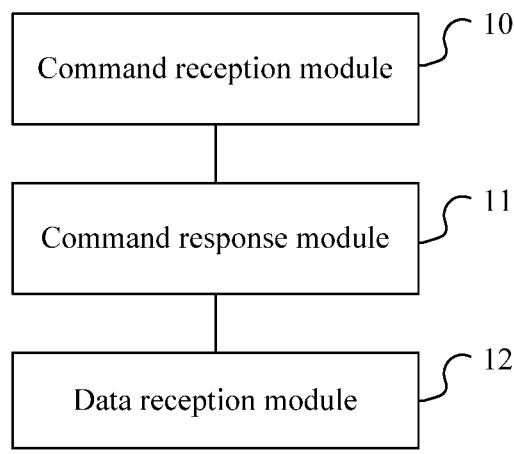
FIG. 3 is a schematic structural diagram of a BMC apparatus according to an embodiment of the present disclosure.

FIG. 3 is a schematic structural diagram of a BMC apparatus according to an embodiment of the present disclosure. The apparatus for transmitting a file based on a BMC according to an embodiment of the present disclosure includes a command reception module 10, a command response module 11, and a data reception module 12.

The command reception module 10 is configured to receive a preset command sent by a first BMC, where the preset command indicates that transmission of a file is to be initiated.

The command response module 11 is configured to parse the preset command, and stop an IPMI process running based on a UART interface in response to the preset command.

The data reception module 12 is configured to receive, by using a communication function of the UART interface, a data file transmitted by the first BMC.

With the apparatus for transmitting a file based on a BMC according to the present disclosure, the second BMC receives the preset command sent by the first BMC, where the preset command indicates that transmission of a file is to be initiated, stops the IPMI process running based on the UART interface on the second BMC in response to the preset command, and receives, by using the communication function of the UART interface, the data file transmitted by the first BMC. Based on the apparatus, when the data file is transmitted between the BMCs, the IPMI process running on the BMC receiving the data file is stopped, such that the data file transmitted between the BMCs is not intercepted and verified by the preset command processing function of the IPMI process running based on the UART interface, and the IPMI process is prevented from being blocked and crashing, thereby implementing transmission of data files between BMCs.

Based on the third embodiment, the command response module 11 further includes a variable modification module and a monitoring calling module.

The variable modification module is configured to parse the preset command and modify a value of a preset flag variable from an initial value to a flag value in response to the preset command.

The monitoring calling module is configured to monitor the flag variable by using a preset process, and stop the IPMI process running based on the UART interface by calling a system function when the value of the flag variable is the flag value.

Fourth Embodiment

A device for transmitting a file based on a BMC is further provided according to the present disclosure. The device includes a memory and a processor.

The memory is configured to store a computer program.

The processor is configured to execute the computer program to implement steps of the above method for transmitting a file based on a BMC.

With the device for transmitting a file based on a BMC according to the present disclosure, the second BMC receives the preset command sent by the first BMC, where the preset command indicates that transmission of a file is to be initiated, stops the IPMI process running based on the UART interface on the second BMC in response to the preset command, and receives, by using the communication function of the UART interface, the data file transmitted by the first BMC. Based on the device, when the data file is transmitted between the BMCs, the IPMI process running on the BMC receiving the data file is stopped, such that the data file transmitted between the BMCs is not intercepted and verified by the preset command processing function of the IPMI process running based on the UART interface, and the IPMI process is prevented from being blocked and crashing, thereby implementing transmission of data files between BMCs.

A computer readable storage medium storing a computer program is further provided according to the present disclosure. The computer program is executed by a processor to implement steps of the above method for transmitting a file based on a BMC.

With the computer readable storage medium for transmitting a file based on a BMC according to the present disclosure, the second BMC receives the preset command sent by the first BMC, where the preset command indicates that transmission of a file is to be initiated, stops the IPMI process running based on the UART interface on the second BMC in response to the preset command, and receives, by using the communication function of the UART interface, the data file transmitted by the first BMC. Based on the computer readable storage medium, when the data file is transmitted between the BMCs, the IPMI process running on the BMC receiving the data file is stopped, such that the data file transmitted between the BMCs is not intercepted and verified by the preset command processing function of the IPMI process running based on the UART interface, and the IPMI process is prevented from being blocked and crashing, thereby implementing transmission of data files between BMCs.

The method, the apparatus, and the device for transmitting a file based on a BMC, and the medium according to the present disclosure are described in detail above. In the present specification, the embodiments are described in progressive manner. Each embodiment mainly focuses on an aspect different from other embodiments, and reference can be made to these similar parts among the embodiments. The apparatus disclosed in the embodiment corresponds to the method disclosed in the embodiment, and is described relatively simply. For detailed description of the apparatus, reference may be made to the related description of the method. It is to be noted that, any improvement and modification on the present disclosure will be apparent to those skilled in the art without departing from the spirit and scope of the present disclosure.

It is also to be noted that in the present specification, the relationship terms such as "first", "second" and the like are only used herein to distinguish one entity or operation from another, rather than to necessitate or imply that an actual relationship or order exists between the entities or operations. Furthermore, the terms such as "include", "comprise" or any other variants thereof mean to be non-exclusive. Therefore, a process, a method, an article or a device including a series of elements include not only the disclosed elements but also other elements that are not clearly enumerated, or further include inherent elements of the process, the method, the article or the device. Unless expressively limited, the statement "including a . . . " does not exclude the case that other similar elements may exist in the process, the method, the article or the device other than enumerated elements.

The invention claimed is:

1. A method for transmitting a file between Baseboard Management Controllers (BMCs), comprising:
   receiving, by a second BMC, a preset command sent by a first BMC, wherein the first BMC communicates with the second BMC through a Universal Asynchronous Receiver/Transmitter (UART) interface, and the preset command indicates that transmission of a file is to be initiated;
   parsing the preset command, and stopping an Intelligent Platform Management Interface (IPMI) process in response to the preset command, wherein the IPMI process intercepts and verifies a control command received through the UART interface; and
   receiving, by using a communication function of the UART interface, a data file transmitted by the first BMC.

2. The method according to claim 1, wherein the parsing the preset command, and stopping the IPMI process in response to the preset command comprises:
   parsing the preset command, and modifying a value of a preset flag variable from an initial value to a flag value in response to the preset command, and
   monitoring the flag variable by using a preset process, and stopping the IPMI process by calling a system function when the value of the flag variable is the flag value.

3. The method according to claim 2, wherein after the receiving, by using the communication function of the UART interface, the data file transmitted by the first BMC, the method further comprises:
   modifying the value of the flag variable to the initial value, and restarting the IPMI process in the second BMC by calling the system function.

4. The method according to claim 2, wherein after the stopping the IPMI process by calling the system function, the method further comprises:
   recording, in a log file, a time instant at which the IPMI process is stopped and parameter information of the second BMC in correspondence with each other.

5. The method according to claim 2, wherein the initial value is 1, and the flag value is 0.

6. The method according to claim 1, wherein the data file is a mirror file of a bin type.

7. A device for transmitting a file between Baseboard Management Controllers (BMC), comprising:
   a memory, configured to store a computer program; and
   a processor, configured to execute the computer program to implement steps of:
   receiving, by a second BMC, a preset command sent by a first BMC, wherein the first BMC communicates with the second BMC through a Universal Asynchronous Receiver/Transmitter (DART) interface, and the preset command indicates that transmission of a file is to be initiated,
   parsing the preset command, and stop an Intelligent Platform Management Interface (IPMI) process in response to the preset command, wherein the IPMI process intercepts and verifies a control command received through the UART interface, and
   receiving, by using a communication function of the UART interface, a data file transmitted by the first BMC.

8. The device according to claim 7, wherein the parsing the preset command, and stopping the IPMI process in response to the preset command comprises:
   parsing the preset command, and modifying a value of a preset flag variable from an initial value to a flag value in response to the preset command, and
   monitoring the flag variable by using a preset process, and stopping the IPMI process by calling a system function when the value of the flag variable is the flag value.

9. The device according to claim 8, wherein after the receiving, by using the communication function of the UART interface, the data file transmitted by the first BMC, the processor is further configured to execute the computer program to implement a step of:
   modifying the value of the flag variable to the initial value, and restarting the IPMI process in the second BMC by calling the system function.

10. The device according to claim 8, wherein after the stopping the IPMI process by calling the system function, the processor is further configured to execute the computer program to implement a step of:
    recording, in a log file, a time instant at which the IPMI process is stopped and parameter information of the second BMC in correspondence with each other.

11. The device according to claim 8, wherein the initial value is 1, and the flag value is 0.

12. The device according to claim 7, wherein the data file is a mirror file of a bin type.

13. A non-transitory computer readable storage medium, storing a computer program, the computer program being executed by a processor to implement steps of the method for transmitting a file between Baseboard Management Controllers (BMCs) according to claim 1.

* * * * *